(12) United States Patent
Faye et al.

(10) Patent No.: US 8,371,553 B2
(45) Date of Patent: Feb. 12, 2013

(54) LONG-STROKE REGULATOR VALVE WITH A STOP FUNCTION

(75) Inventors: Olivier Faye, Menilles (FR); William Barre, Louviers (FR)

(73) Assignee: SNECMA, Paris (FR)

( * ) Notice: Subject to any disclaimer, the term of this patent is extended or adjusted under 35 U.S.C. 154(b) by 822 days.

(21) Appl. No.: 12/141,345

(22) Filed: Jun. 18, 2008

(65) Prior Publication Data

US 2008/0315142 A1 Dec. 25, 2008

(30) Foreign Application Priority Data

Jun. 19, 2007 (FR) ...................................... 07 55845

(51) Int. Cl.
*F16K 5/10* (2006.01)
*F16K 5/06* (2006.01)

(52) U.S. Cl. ........................................ 251/209; 251/310
(58) Field of Classification Search .................. 251/209, 251/208, 205, 310
See application file for complete search history.

(56) References Cited

U.S. PATENT DOCUMENTS

| | | | | |
|---|---|---|---|---|
| 2,196,219 A | * | 4/1940 | Madden | 251/207 |
| 2,558,260 A | * | 6/1951 | Maky | 251/174 |
| 3,123,334 A | * | 3/1964 | Hitz | 251/147 |
| 3,241,570 A | * | 3/1966 | Mueller | 137/625.16 |
| 3,404,864 A | * | 10/1968 | Reddy | 251/172 |
| 3,409,270 A | * | 11/1968 | Hulsey | 251/209 |
| 3,485,475 A | * | 12/1969 | Skei et al. | 251/159 |
| 3,612,102 A | * | 10/1971 | Hulsey | 137/625.3 |
| 3,795,384 A | * | 3/1974 | Reddy | 251/257 |
| 4,130,268 A | * | 12/1978 | Kojima et al. | 251/298 |
| 4,253,485 A | * | 3/1981 | Legille | 137/315.16 |
| 4,674,534 A | * | 6/1987 | Price-Falcon | 137/613 |
| 4,962,911 A | * | 10/1990 | Soderberg | 251/159 |
| 4,993,453 A | * | 2/1991 | McHugh | 137/559 |
| 5,370,154 A | * | 12/1994 | Greer | 137/625.32 |
| 5,524,863 A | * | 6/1996 | Davis | 251/127 |
| 5,799,928 A | * | 9/1998 | Siver | 251/214 |
| 6,899,128 B2 | * | 5/2005 | Oh | 137/556 |
| 7,150,445 B2 | | 12/2006 | Faye et al. | |

FOREIGN PATENT DOCUMENTS

EP 1 367 305 A2 12/2003

* cited by examiner

*Primary Examiner* — Stephen M Hepperle
*Assistant Examiner* — Jonathan Waddy
(74) *Attorney, Agent, or Firm* — Preti Flaherty Beliveau & Pachios LLP

(57) ABSTRACT

The invention relates to a valve device comprising a valve body defining a fluid flow duct having a throttle element disposed therein and turned about its axis by actuator means via a drive shaft, the throttle element having an internal cavity defined by a circular wall that is open in its bottom portion. The circular wall also presents, over a portion of its periphery, an opening of varying shape so as to define a fluid flow passage in the duct that is variable between a fully-open position in which the opening co-operates in full with the duct, and a fully-closed position in which said circular wall closes the duct. The device further includes an annular sealing gasket disposed in the flow duct, said gasket being in contact with the wall of the internal cavity in the throttle element. The internal cavity of the throttle element is spherical in shape so that in the fully-closed position of the valve, the entire circumferential of the sealing gasket is in contact with the wall of the internal cavity of the throttle element.

7 Claims, 5 Drawing Sheets

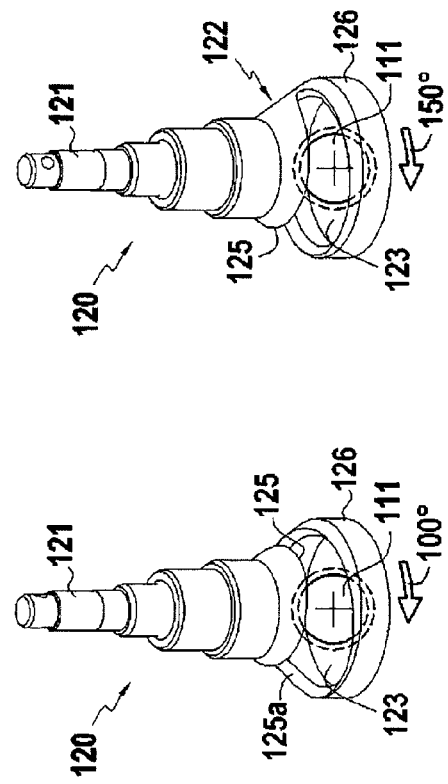
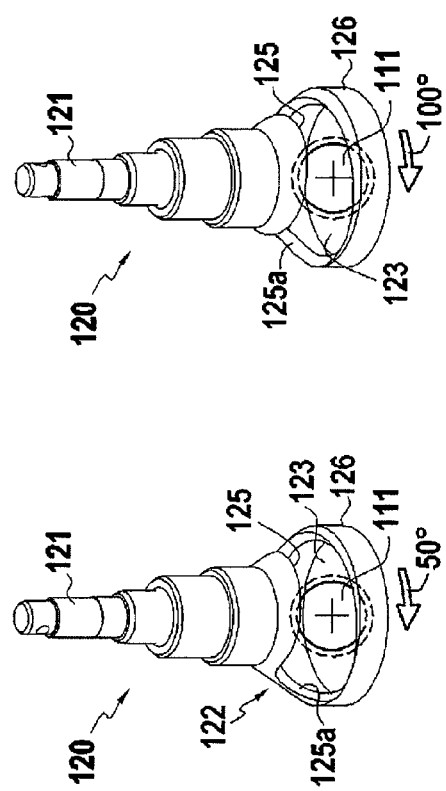
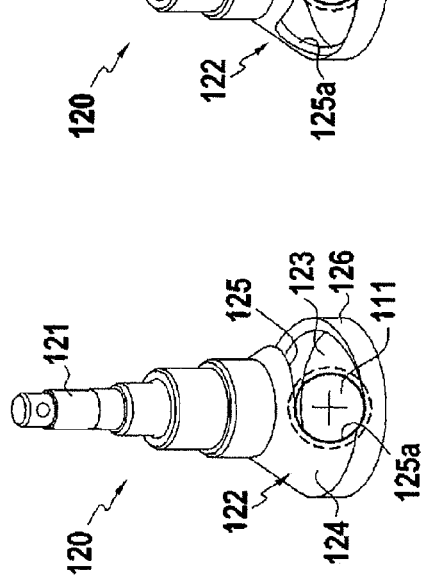
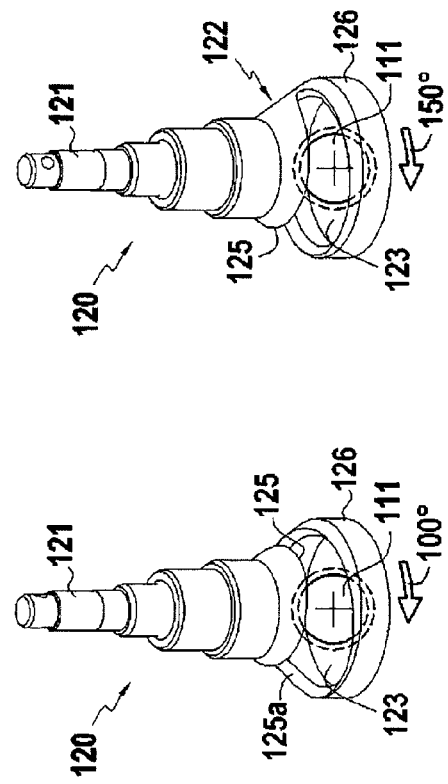
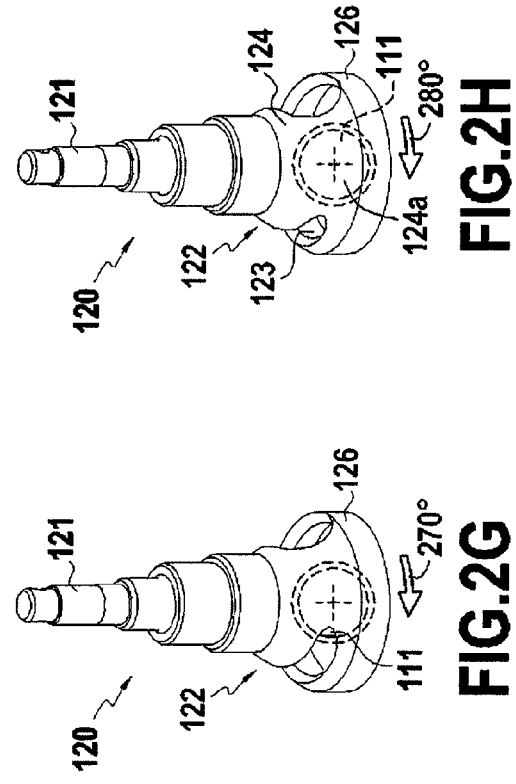
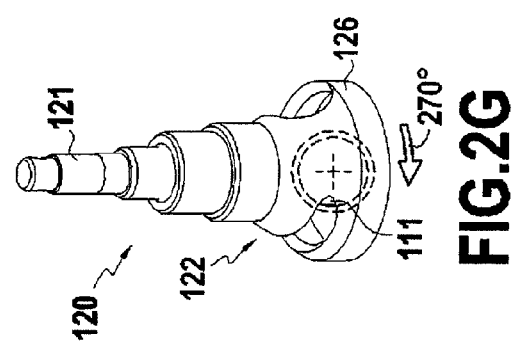
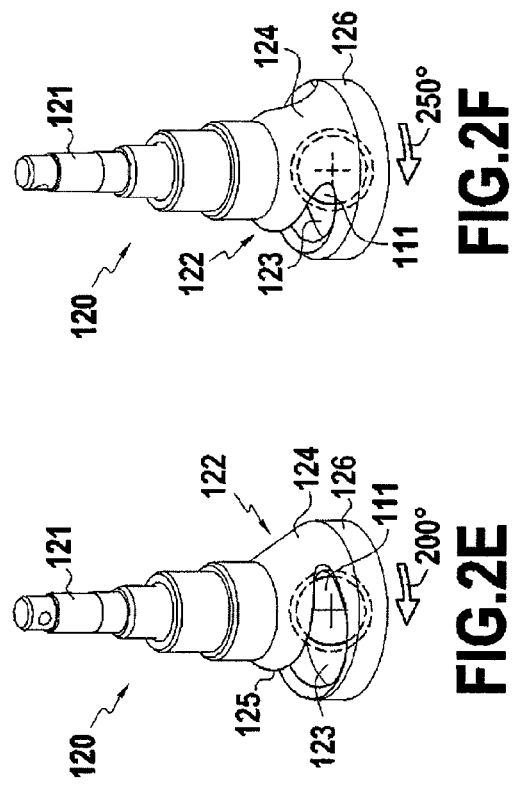
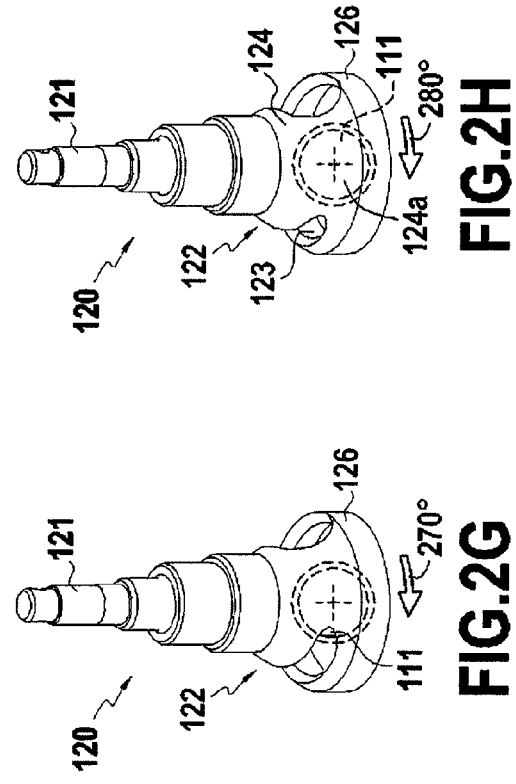

LONG-STROKE REGULATOR VALVE WITH A STOP FUNCTION

This application claims priority to French Appln. 0755845 filed Jun. 19, 2007.

FIELD OF THE INVENTION

The present invention relates to the field of regulator valves serving to adjust head loss in a fluid flow circuit such as a cryogenic fluid feed circuit used in a rocket engine. This type of valve is provided with a shutter element that, as a function of its position, regulates head loss and consequently fluid flow rate in the duct.

PRIOR ART

Regulator valves are already present in most fluid regulator systems and they constitute an important element of such a system. Complex and intelligent regulator systems are continuously being developed so as to provide ever higher performance control over fluid adjustment. Nevertheless, whatever the processing level of the regulation process, regulation systems must always terminate by acting on physical adjustment elements, i.e. regulator valves.

For this purpose, regulator valves have developed so as to enable precise action to be taken on a fluid at small cost, and preferably so as to enable action to be taken that is proportional to the command applied to the valve, over a range of fluid flow rates going from practically zero flow to a flow rate that is as large as possible in a given volume.

In many industries, the constraints on regulator valves in terms of cost and reliability are more important than those in terms of size and weight. Thus, it is known to use time-tested traditional valve technologies such as quarter-turn valves of the plug, butterfly, or slot type. The simplicity of their design and the vast range of utilizations enables standardized ranges of valves to be provided at low cost, which valves present a good level of reliability, and regulation performance that is satisfactory, given the acceptable design margins. The operating accuracy required for regulation purposes then relies on an actuator that is fitted to the valve and when the actuator is associated with a significant level of power (electrical or hydraulic) and with high-performance controlling electronics, it is the actuator that governs overall control of the regulation system. In particular, the use of digital control electronics makes it possible at low cost to implement closed-loop servo-control functions of accuracy that is theoretically without limit.

In that type of system, the function of providing sealing of stopping the valve at the end of its stroke does not present any particular technical difficulty and can be implemented using the same principles as are used with on/off valves of the same type, and this can be done without disturbing or limiting the adjustment/regulation function of the valve.

Nevertheless, in an aviation context, and a fortiori in a space launcher context, the nature and the level of the requirements that apply to regulator valves are quite different. In addition to the very particular fluids that valves are called on to handle in this field (cryogenic, oxidizer, cooling, etc. fluids), the predominant constraint is that of weight. Furthermore, in space launchers, electrical energy is limited and the cost of sophisticated control electronics is very high.

A valve device suitable for providing a highly satisfactory response to the conditions specific to space applications is described in document U.S. Pat. No. 7,150,445. Nevertheless, although the valve device described in that document constitutes a high-performance regulation member, in particular when used as a bypass type valve in a rocket engine, it does not present a design that is also suitable for providing a reliable stop function. Unfortunately, most rocket engine operating cycles require the adjustment/regulation means to be coupled to stop means enabling fluid circuits to be isolated completely, thus enabling the engine to be stopped and made safe. One solution then consists in incorporating two valves in series, each dedicated to a specific function, namely a first valve acting as a stop valve in series with a second valve acting as a regulator valve.

That solution nevertheless presents the major drawback of increasing the number of members that need to be controlled, the number of control interfaces, and the volumes occupied in the engine, and it consequently has a negative impact on the performance and the cost of the rocket engine. There thus exists a need for enabling the cost, the weight, and the size of fluid control systems in rocket engines to be reduced even further.

OBJECT AND BRIEF SUMMARY OF THE INVENTION

The present invention seeks to remedy the above-mentioned drawbacks and to provide a valve device capable on its own both of performing a regulation/adjustment function with greater accuracy and a stop function that is reliable, and to do so with a design that is sufficiently simple to enable the valve device to be incorporated easily in existing control systems while minimizing manufacturing costs.

These objects are achieved by a valve device comprising a valve body defining a fluid flow duct having a throttle element disposed therein and turned about its axis by actuator means via a drive shaft, the throttle element having an internal cavity defined by a circular wall that is open in its bottom portion. The circular wall also presents, over a portion of its periphery, an opening of varying shape so as to define a fluid flow passage in the duct that is variable between a fully-open position in which the opening co-operates in full with the duct, and a fully-closed position in which said circular wall closes the duct. In accordance with the invention, the valve device further comprises an annular sealing gasket disposed in the flow duct, the gasket being in contact with the wall of the internal cavity in the throttle element. The internal cavity of the throttle element is spherical in shape so that in the fully-closed position of the valve, the entire circumference of the sealing gasket is in contact with the wall of the internal cavity of the throttle element.

Thus, the valve device of the invention makes it possible with a single throttle element not only to provide adjustment/regulation with great accuracy, but also to provide a stop function that is reliable.

The device of the invention has a throttle element that provides a long adjustment/regulation stroke, thereby making it possible to reduce the positioning accuracy that is normally required on the actuator and the controlling electronics, but without that decreasing the accuracy of the regulation performed by the valve. The costs induced on the actuator and on the associated electronics are therefore significantly decreased.

Furthermore, by performing the stop function with an annular gasket bearing against the wall of the internal cavity of the throttle embodiment, which wall forms a spherical bearing surface for the gasket, excellent sealing is provided between the upstream and downstream portions of the valve duct, and consequently a stop function is obtained that presents great reliability and good availability. It is easy and simple to incorporate control over the stop function in the regulation electronics since this function is performed by the throttle element that is already being controlled in order to adjust the valve.

In addition, when the valve device is for controlling the flow of cryogenic fluids, as in space launchers, it is impossible to use materials such as rubber-type polymers for providing sealing against surfaces that are not plane, because of the way the polymer stiffens at low temperature. The design of the valve device of the invention makes it possible to solve this problem by reducing sealing to cylindrical/spherical contact, thereby making it possible to use a gasket with a plane bearing surface. In the present invention, the annular sealing gasket placed in the flow duct is preferably made of one of the following materials: polytetrafluoroethylene (PTFE), commonly called Teflon®; Vespel® polyimide; and polytrifluorochlorethylene (PTFCE).

The valve device of the invention combines the adjustment and stop functions while presenting an architecture that is simple and compact, thereby making it possible to control development and manufacturing costs.

In an aspect of the invention, the throttle element includes a ring of material below the opening in such a manner that, even in the fully-open position of the valve, the sealing gasket can bear against at least two diametrically-opposite zones. This makes it possible to avoid any risk of the gasket being damaged during movements of the throttle element.

The valve device of the invention also includes a gasket-carrier tube placed in the fluid flow duct, the gasket being held between the end of the gasket-carrier tube and the wall of the internal cavity of the throttle element.

The gasket-carrier tube can be held in a stationary position inside the fluid flow duct or it can be mounted to slide in the duct. When the tube is slidable, the device further includes means for applying a holding force on the gasket-carrier tube, urging it towards the wall of the internal cavity of the throttle element, thus making it possible to provide contact force between the gasket and the throttle element that is practically constant even in the event of the gasket wearing.

The opening in the throttle element may present a profile that enlarges progressively around the throttle element so as to obtain variation in the fluid flow section that varies in linear manner as a function of angle of rotation between the fully-open position and the fully-closed position.

Nevertheless, the opening could present some other profile depending on a desired head loss relationship.

The opening of the throttle element can extend around the circular wall of the throttle element over an angle of up to about 250°.

BRIEF DESCRIPTION OF THE DRAWINGS

Other characteristics and advantages of the invention appear from the following description of particular embodiments of the invention, given as non-limiting examples, and with reference to the accompanying drawings, in which:

FIGS. 2A to 2H show the throttle element of the FIG. 1 valve device on being moved between a fully-open position and a fully-closed position;

DETAILED DESCRIPTION OF EMBODIMENTS OF THE INVENTION

Figure 1:
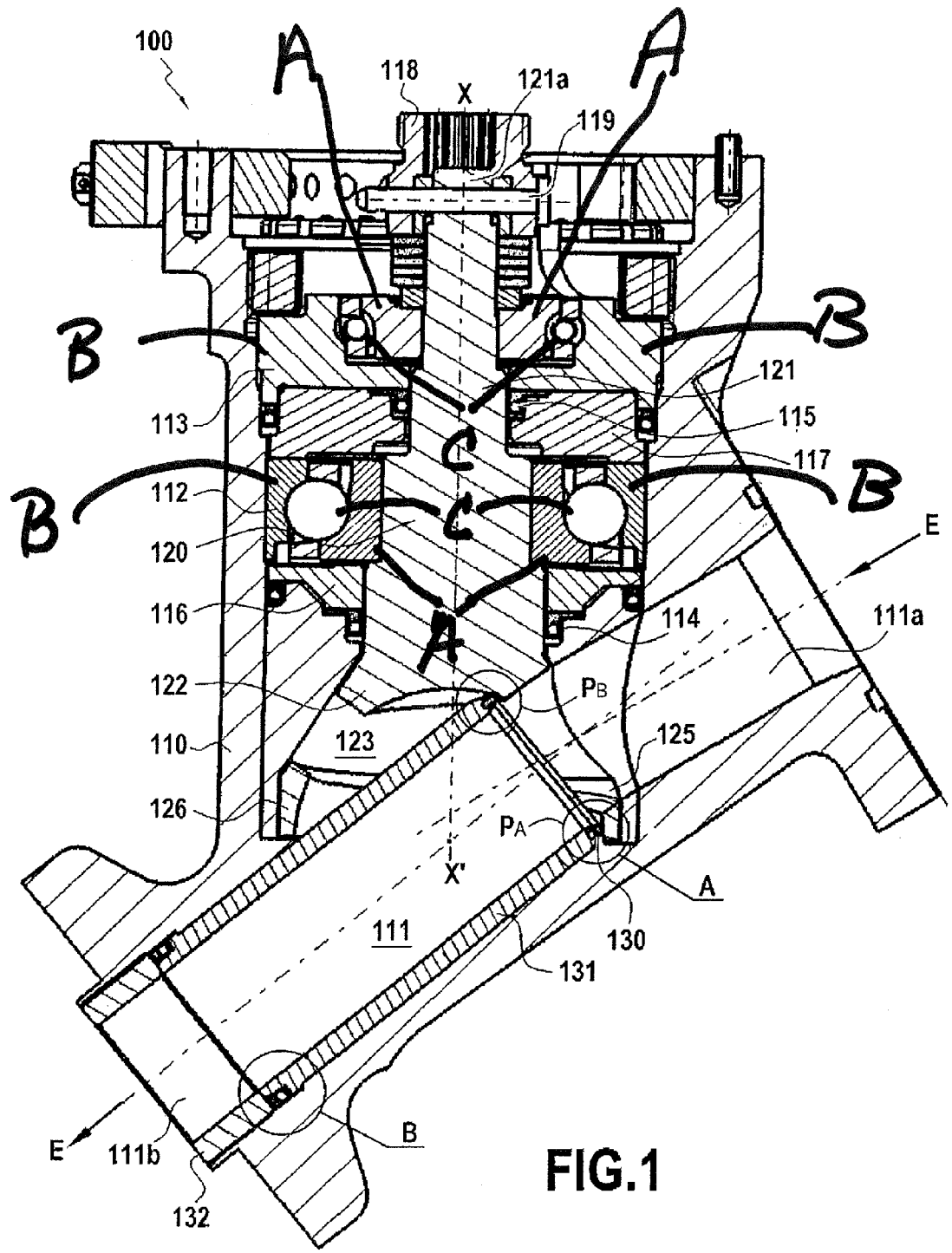
FIG. 1 is a diagrammatic cross-section view of a valve device constituting a first embodiment of the invention.

FIG. 1 shows a regulator valve device 100 constituting an embodiment of the invention and comprising a valve body 110 defining, in its bottom portion, a fluid flow duct 111 comprising an upstream portion 111a and a downstream portion 111b relative to a flow direction E. Each of the portions 111a and 111b of the duct 111 has a respective connection flange for enabling the valve device to be inserted in a fluid flow circuit such as a cryogenic fluid circuit in a rocket engine, for example. The valve device 100 also has a throttle element 120 disposed inside the valve body 110.

The throttle element 120 is designed to be turned about its own axis of revolution XX', and it comprises a top portion 121 of stepped shape that bears against ball bearings 112 and 113 with oblique contact to take up axial and lateral forces. Sealing between the fluid flow duct 111 and the remainder of the valve device is provided in particular by gaskets 114 and 115 disposed between the throttle element 120 and the valve body 111 via respective gasket-carrier bushings 116 and 117. The end 121a of the top portion of the throttle element is connected via a pin 119 to a coupling part 118 for coupling to an actuator shaft (not shown) for turning the throttle element about its axis XX'.

As shown in FIG. 2A, the throttle element also has a bottom portion 122 that extends into the fluid flow duct 111. This portion of the throttle element is hollow so as to form an internal cavity 123 defined by a circular wall 124 that is open in its bottom portion. The circular wall 124 also has an opening 125 of varying shape so as to enable fluid flow along the duct 111 to be regulated.

More precisely, as shown in FIGS. 2A to 2H, the valve is actuated by turning the throttle element 120 between a fully-open position, in which the opening 125 co-operates in full with the duct 111, thereby releasing an almost rectilinear flow section with very low head loss (FIG. 2A), and a fully-closed position in which the circular wall 124 completely shuts the duct 111 (FIG. 2H). Because of its opening 125 of varying shape, the throttle element 120 enables the hydraulic flow section formed by the duct 111 to be closed progressively, with the variation in the fluid flow section being a function of the angle of rotation applied to the throttle element 120 as shown in FIGS. 2A to 2H.

Figure 3:
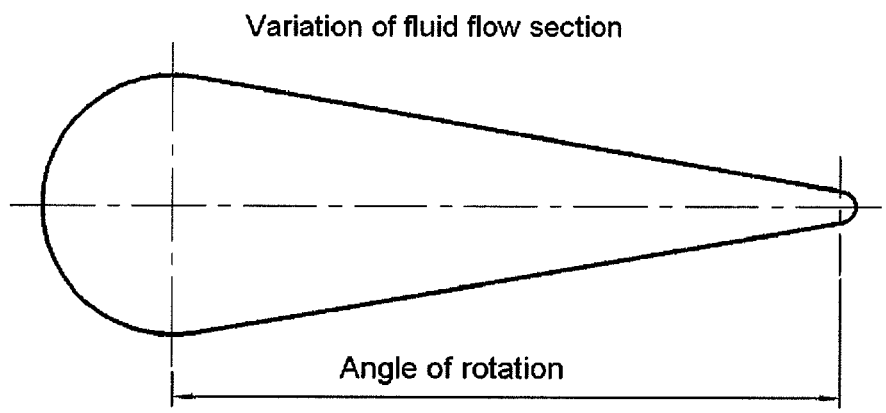
FIG. 3 is a developed view on a plane showing how the fluid flow section varies as the throttle element is turned.

The opening 125 extends around the circular wall 124 of the throttle element 120 over an angle of about 250°. The opening 125 enlarges progressively around the throttle element, thereby enabling the fluid flow section to be regulated or adjusted over a large angle of rotation (here 270°), and thus with excellent precision in adjusting the valve. FIG. 3 shows how the fluid flow section varies when the throttle element is turned between its open and closed positions.

The opening 125 presents at least a first portion 125a that forms an opening of size equivalent to the section of the duct 111 so as to enable the wall 124 to be fully retracted when the valve is in the fully-open position. Conversely, the wall 124 must also present a solid portion 124a of area that is not less than the section of the duct 111 so as to enable the duct 111 to be fully closed when the valve is in the fully-closed position.

In the embodiment being described, the opening 125 presents a profile that tapers progressively, thereby enabling the flow section to be varied in linear manner with angle of rotation (head loss is practically linear). Nevertheless, the shape of the profile of the opening could be adapted as a function of any head loss relationship that might be desired for the valve (variation in the slope of the profile, a stepped profile, etc.).

Figure 1A:
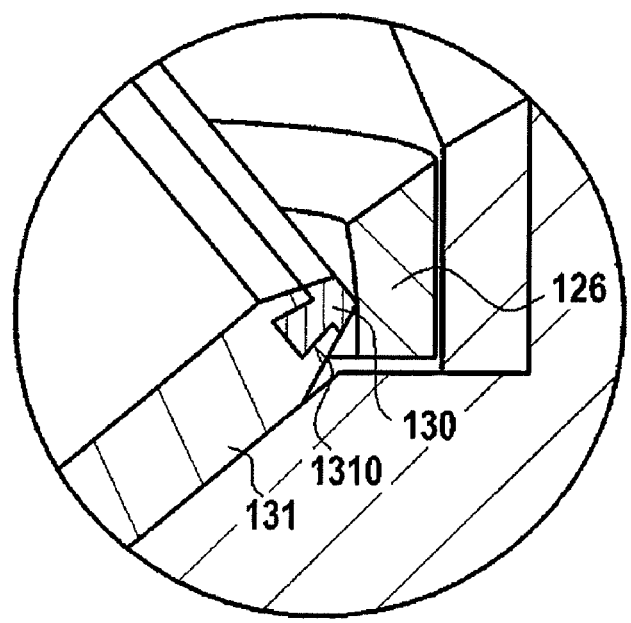
FIGS. 1A and 1B are detail views of the FIG. 1 valve device.
Figure 1B:
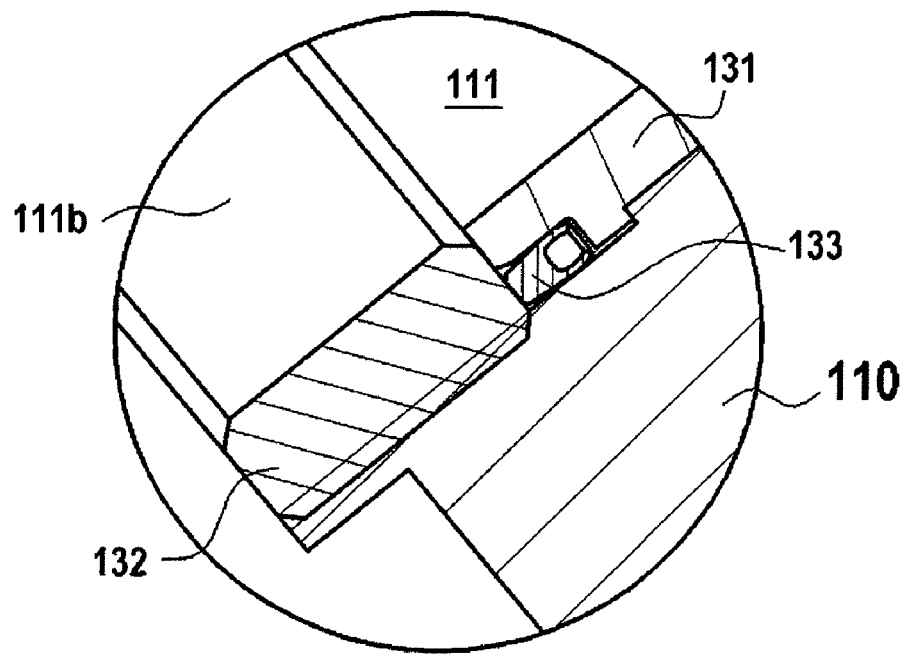

In accordance with the invention, the valve device 100 also has an annular sealing gasket 130 disposed between the upstream and downstream portions 111a and 111b of the duct 111. In the embodiment shown in FIG. 1, the sealing gasket 130 is held pressed against the wall of the internal cavity 123 of the throttle element 120 by a gasket-carrier tube 131 placed downstream from the throttle element 120 in the duct 111. The gasket-carrier tube 131 has an annular housing 1310 at its ends close to the throttle element, which housing holds the gasket 130 (FIG. 1A). Since the gasket-carrier tube 131 is held in position by a locking ring 132 that is fastened in the valve body by screw-fastening, welding, adhesive, or in some other way, sealing between the gasket carrier 131 and the ring 132 is provided by means of a gasket 133 (FIG. 1B).

Figure 4:
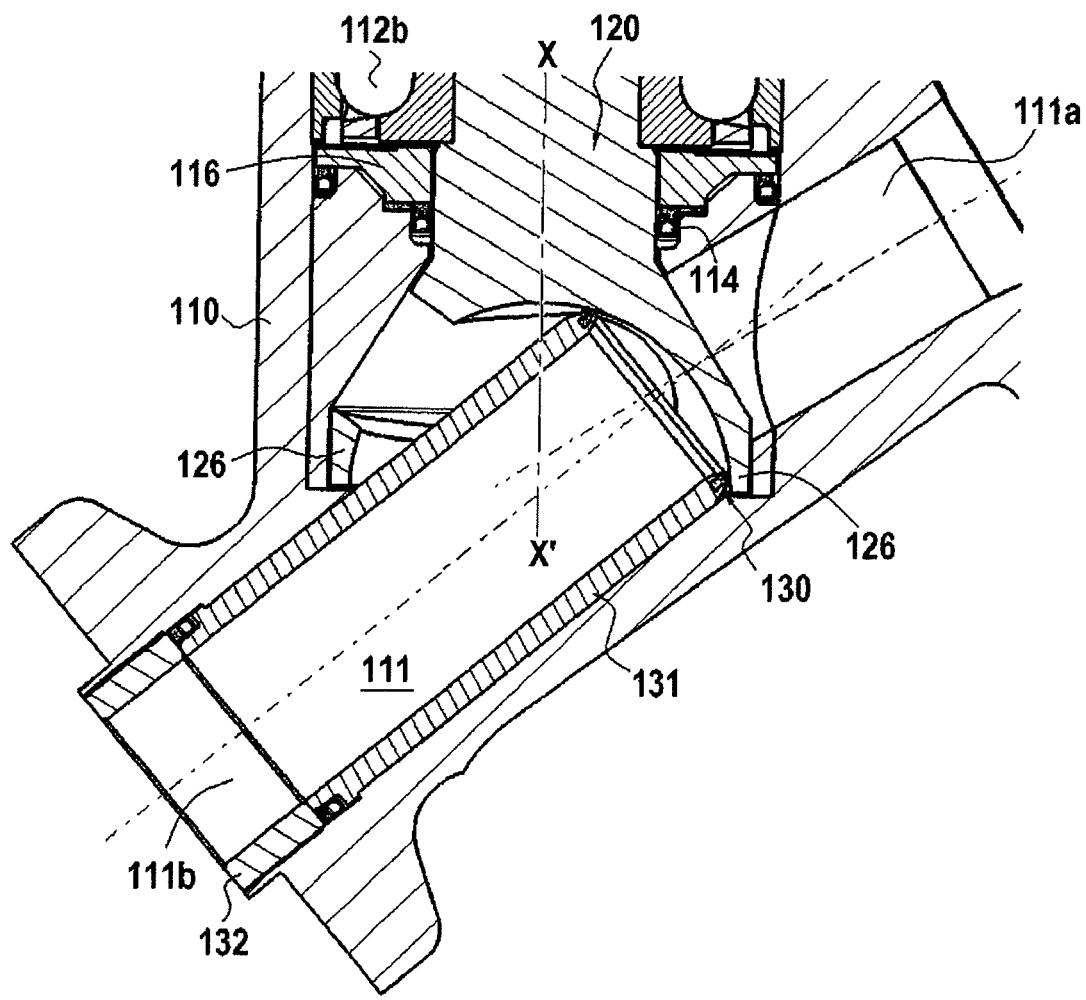
FIG. 4 shows the FIG. 1 valve device in a fully-closed position.

Still in accordance with the invention, the internal cavity 123 is spherical in shape, thus making it possible in the fully-closed position to have a contact surface between the annular sealing ring 130 and the wall of the internal cavity 123 that extends around the entire circumference of the gasket. Thus, in the fully-closed position as shown in FIG. 4, the gasket 130 provides upstream/downstream sealing in the duct, thereby giving the valve device 100 a stop function in addition to its regulation/adjustment function.

Furthermore, as shown in FIGS. 1 and 2A to 2H, the opening 125 formed in the wall 124 of the throttle element 120 stops before the bottom edge of the throttle element 120 so as to leave a ring of material 126 around the entire bottom periphery of the throttle element 120. On its internal cavity side, the ring of material 126 constitutes a permanent bearing zone for the sealing ring 130. The presence of the ring of material 126 consequently enables the sealing gasket 130 always to have at least two diametrically-opposite bearing zones $P_A$ and $P_B$ against the wall of the internal cavity 123 of the throttle element 120, even when in the fully-open position as shown in FIG. 1. This makes it possible to avoid the annular sealing gasket 130 being damaged by the throttle element turning, since by providing at least two diametrically-opposite bearing zones against the wall of the internal cavity 123 over the entire rotary stroke of the throttle element, the throttle element exerts a balanced thrust force on the gasket, thereby contributing to keeping it in place in the housing of the gasket-carrier tube. The opening 125 presents a maximum height that is less than the diameter of the sealing gasket 130.

Figure 5:
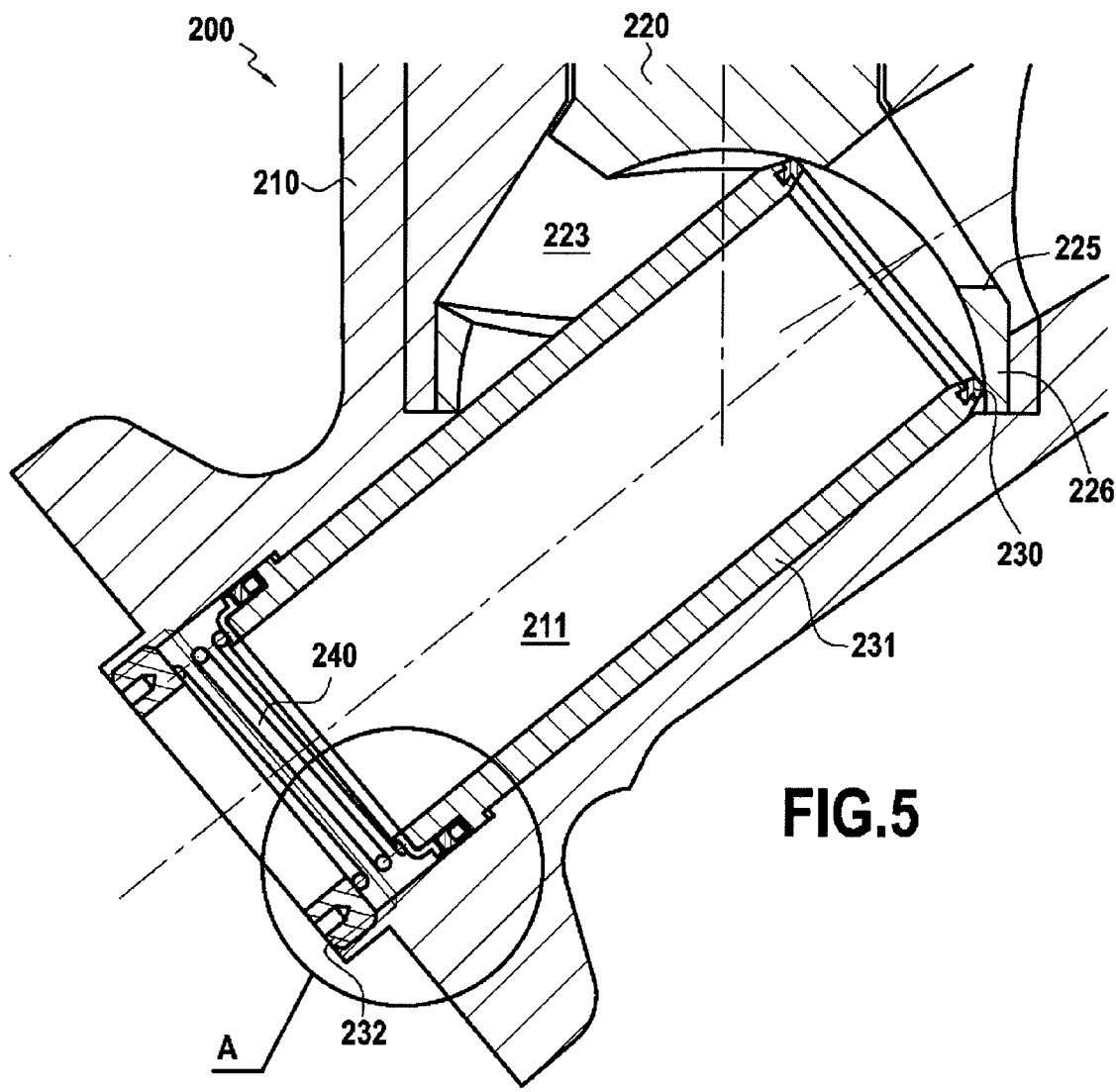
FIG. 5 is a diagrammatic cross-section view of a variant embodiment of a valve device of the invention.
Figure 5A:
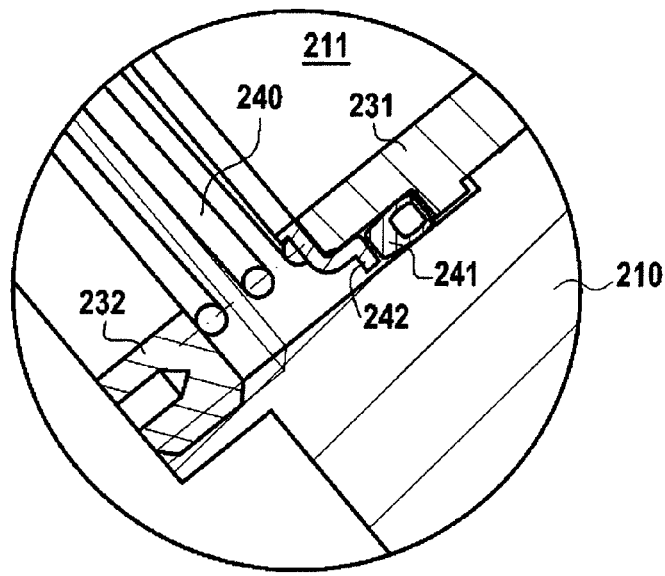
FIG. 5A is a detail view of the FIG. 5 valve device.

FIG. 5 shows a variant embodiment of the valve device 200 that differs from the embodiment shown in FIG. 1 in that the annular sealing gasket is held against the wall of the internal cavity of the throttle element by a return force. More precisely, as shown in FIG. 5, the valve device 200 comprises a valve body 210 having placed therein a throttle element 220 similar to that described above for the valve device 100. Similarly, the valve device 200 has an annular sealing gasket 230 in contact with the spherical wall of the internal cavity 223 of the throttle element 220. The sealing gasket 230 is placed at the end of a gasket-carrier tube 231, which tube is mounted to slide in the fluid flow duct 211. In order to exert a holding force on the gasket-carrier tube 230 urging it towards the wall of the internal cavity 223 of the throttle element, a spring 240 is compressed between the other end of the gasket carrier 231 and a locking ring 232, with a gasket 241 and a bearing washer 242 providing sealing between the gasket carrier and the ring (FIG. 5A). This configuration enables a constant contact force to be ensured between the gasket and the throttle element, in particular in the event of the gasket suffering wear. In the embodiment being described, the mechanical force applied on the gasket carrier is obtained by means of a coil spring. Nevertheless, any other type of resilient element suitable for exerting a force urging the tube towards the throttle element could be used. Such a resilient element could also be covered in a protective material when the material of the element might otherwise be damaged by the fluid flowing in the duct 211. In a variant, the resilient element may be constituted by a bellows placed between the gasket carrier and the locking ring, the bellows thus providing both the mechanical force on the gasket carrier and sealing between the gasket carrier and the locking ring.

What is claimed is:

1. A valve device comprising:
    a valve body defining a fluid flow duct;
    a throttle element disposed in the valve body and adapted to be turned about its axis by actuator means via a drive shaft, the throttle element having:
        a bottom portion that is structured and arranged to extend into the fluid flow duct,
        an annular ring that is disposed about a periphery of a bottom edge of the bottom portion,
        a spherical internal cavity defined by a circular wall that is completely open at the bottom portion, and
        a single variable-shape opening defining a fluid flow passage in the fluid flow duct, the opening disposed through a portion of the circular wall of the internal cavity and having a shape, the shape of the single opening varying progressively around a substantial portion of the circular wall between a fully-open position in which the opening communicates in full with the fluid flow duct, and a fully-closed position in which said circular wall closes the fluid flow duct;
    a gasket-carrier tube that is disposed within the fluid flow duct; and
    an annular sealing gasket that is coupled to a distal end of the gasket-carrier tube disposed in the fluid flow duct so as to surround an opening in the gasket-carrier tube, said gasket structured and arranged to continuously maintain contact with the annular ring at least at the periphery of the bottom edge of the bottom portion of the throttle element and with the circular wall of the internal cavity as the throttle element is turned about its axis between the fully-open position and the fully-closed position, and said tube opening and gasket being distal from the axis of the throttle element,
    wherein said axis does not penetrate said tube opening or gasket as said throttle element rotates about said axis.

2. A valve device according to claim 1, wherein the variable-shape opening presents a maximum height that is less than a diameter of the annular sealing gasket.

3. A valve device according to claim 1, further comprising means for holding the gasket-carrier tube in a stationary position inside the fluid flow duct.

4. A valve device according to claim 1, wherein the gasket-carrier tube is mounted to slide in the fluid flow duct, and the device further including means for applying a force on the gasket-carrier tube, urging it towards the wall of the internal cavity of the throttle element.

5. A valve device according to claim 1, wherein the variable-shape opening presents a profile that enlarges progressively along the throttle element.

6. A valve device according to claim 1, wherein the variable-shape opening presents a profile that is a function of a desired head loss relationship.

7. A valve device according to claim 1, wherein the variable-shape opening extends around the circular wall of the throttle element over an angle of up to 250°.

* * * * *